(12) United States Patent
Glass et al.

(10) Patent No.: US 10,367,777 B2
(45) Date of Patent: Jul. 30, 2019

(54) ONLINE GIFT DELIVERY CONFIRMATION SYSTEM AND METHOD

(71) Applicant: GIFT CARD IMPRESSIONS, LLC, Kansas City, MO (US)

(72) Inventors: Brett R. Glass, Kansas City, MO (US); Karl Joseph Geisler, Kansas City, MO (US)

(73) Assignee: Gift Card Impressions, LLC, Kansas City, MO (US)

( * ) Notice: Subject to any disclaimer, the term of this patent is extended or adjusted under 35 U.S.C. 154(b) by 0 days.

(21) Appl. No.: 14/818,397

(22) Filed: Aug. 5, 2015

(65) Prior Publication Data
US 2016/0036758 A1 Feb. 4, 2016
US 2018/0026931 A9 Jan. 25, 2018

Related U.S. Application Data (60) Provisional application No. 62/033,457, filed on Aug. 5, 2014.

(51) Int. Cl.
*H04L 12/58* (2006.01)
*H04W 4/14* (2009.01)
*H04W 74/08* (2009.01)

(52) U.S. Cl.
CPC ............. *H04L 51/34* (2013.01); *H04L 51/28* (2013.01); *H04L 51/30* (2013.01); *H04W 4/14* (2013.01); *H04W 74/0808* (2013.01)

(58) Field of Classification Search
CPC ......... H04L 51/34; H04L 51/28; H04L 51/30; H04W 4/14
See application file for complete search history.

(56) References Cited

U.S. PATENT DOCUMENTS

| | | | | |
|---|---|---|---|---|
| 8,571,524 B2* | 10/2013 | Atarius | | 455/412.1 |
| 9,582,822 B2* | 2/2017 | Glass | | G06F 3/016 |
| 9,785,992 B2* | 10/2017 | Glass | | G06Q 30/0621 |
| 9,824,377 B1* | 11/2017 | Wheeler | | G06Q 30/0601 |
| 2006/0149585 A1* | 7/2006 | Mori et al. | | 705/1 |
| 2008/0243630 A1* | 10/2008 | Farney | | G06Q 30/06 705/26.41 |

(Continued)

*Primary Examiner* — Patrick N Edouard
*Assistant Examiner* — Eboni N Hughes
(74) *Attorney, Agent, or Firm* — Erise IP, P.A.

(57) ABSTRACT

An online delivery servicing system includes a server that functions with a customer computing device to obtain delivery confirmation request information associated with an online gift purchased by a customer for a recipient in which the delivery confirmation request information is associated with a quantity of delivery confirmation messages to be transmitted to a recipient of the online gift and a period of elapsed time for each delivery confirmation message. At each period of elapsed time, the server transmits one of the delivery confirmation messages to a recipient computing device associated with the recipient such that, when a response to the one delivery confirmation message is received, the server transmits a customer confirmation message to the customer computing device, and when the quantity of delivery confirmation messages have been transmitted and no response has been received from the recipient computing device, the server transmits a customer delivery failure message to the customer computing device.

20 Claims, 7 Drawing Sheets

(56) References Cited

U.S. PATENT DOCUMENTS

| | | | | |
|---|---|---|---|---|
| 2011/0022447 A1* | 1/2011 | Pelaic | .................... | G06Q 30/02 |
| | | | | 705/14.1 |
| 2012/0220319 A1* | 8/2012 | Makin | .................... | H04W 4/14 |
| | | | | 455/466 |
| 2013/0346337 A1* | 12/2013 | O'Donnell | ......... | G06Q 10/0833 |
| | | | | 705/333 |
| 2014/0279276 A1* | 9/2014 | Tolcher | ............. | G06Q 20/3255 |
| | | | | 705/26.81 |
| 2015/0019445 A1* | 1/2015 | Glass | .................. | G06F 3/0481 |
| | | | | 705/304 |
| 2015/0039433 A1* | 2/2015 | Raina | .................... | H04L 51/24 |
| | | | | 705/14.55 |
| 2015/0088999 A1* | 3/2015 | Carr | ....................... | H04L 51/30 |
| | | | | 709/206 |
| 2016/0380947 A1* | 12/2016 | Lee | ........................ | H04L 51/14 |
| | | | | 709/206 |

* cited by examiner

Congratulations!

The recipient (John) has acknowledged receipt of your online gift.

Fig. 8

This message is to inform you, our customer, that the receipt of your gift has not been acknowledged by the recipient (John).

○ Re-send the online gift using different contact information /902

○ Cancel the online gift purchase /904

Fig. 9

ONLINE GIFT DELIVERY CONFIRMATION SYSTEM AND METHOD

RELATED APPLICATIONS

This application takes priority to U.S. Patent Application Ser. No. 62/030,457, and entitled "Online Gift Delivery Confirmation System and Method." The contents of application Ser. No. 62/030,457 is hereby incorporated by reference in its entirety.

FEDERALLY SPONSORED RESEARCH OR DEVELOPMENT

Not Applicable.

COMPACT DISK APPENDIX

Not Applicable.

BACKGROUND

Online shopping (e.g., e-shopping) is a form of electronic commerce that allows customers to purchase goods from a merchant over the Internet. A particular type of online shopping that has recently seen relatively large growth includes online gift purchases. For example, digital gift cards (e.g., e-gift cards) or other types of digital transaction value cards have become a popular gifting means due to their relatively ease of use.

A particular problem incurred, however, with the use of online gifts is that delivery of these online gifts often impaired such that the recipient of the online gift actually takes possession of the online gift. For example, many email clients, such as THUNDERBIRD™, OPERA™, or INTERNET EXPLORER™ include spam filters that may block delivery of the online gift if not configured properly. Additionally, even if an email message conveyed the online gift is received, the commercial nature of email messages generated by merchants causes the email messages to be perceived as junk mail such that the recipient never actually opens or reads the email to determine that the email message includes an online gift from the purchaser of the online gift. It is with these issues in mind, among others, that various aspects of the present disclosure were conceived.

SUMMARY

According to one embodiment of the present disclosure, an online delivery servicing system includes a server that functions with a customer computing device to obtain delivery confirmation request information associated with an online gift purchased by a customer for a recipient in which the delivery confirmation request information is associated with a quantity of delivery confirmation messages to be transmitted to a recipient of the online gift and a period of elapsed time for each delivery confirmation message. At each period of elapsed time, the server transmits one of the delivery confirmation messages to a recipient computing device associated with the recipient such that, when a response to the one delivery confirmation message is received, the server transmits a customer confirmation message to the customer computing device, and when the quantity of delivery confirmation messages have been transmitted and no response has been received from the recipient computing device, the server transmits a customer delivery failure message to the customer computing device.

DETAILED DESCRIPTION

Although online gifting has become a commonly accepted gifting medium, their use has not been without limitation. For example, conventional online gifting delivery systems, such as email messaging, are not always received by the recipient due to various reasons, such as by being blocked by spam filters configured in the email client of the recipient, or overlooked by the recipient in an email inbox, which may include a relatively large number of entries. Embodiments of the present disclosure provide a solution to this problem using an application executed on a server that functions with an online gifting platform of a merchant to send one or more delivery confirmation messages (e.g., reminder messages) to inform the recipient that an online gift has been previously sent. Additionally, the application, upon successful response to the reminder message by the recipient, transmits a confirmation success message back to the customer who purchased the online gift, thus enhancing confidence that the online gift was actually received by the recipient.

Figure 1A:
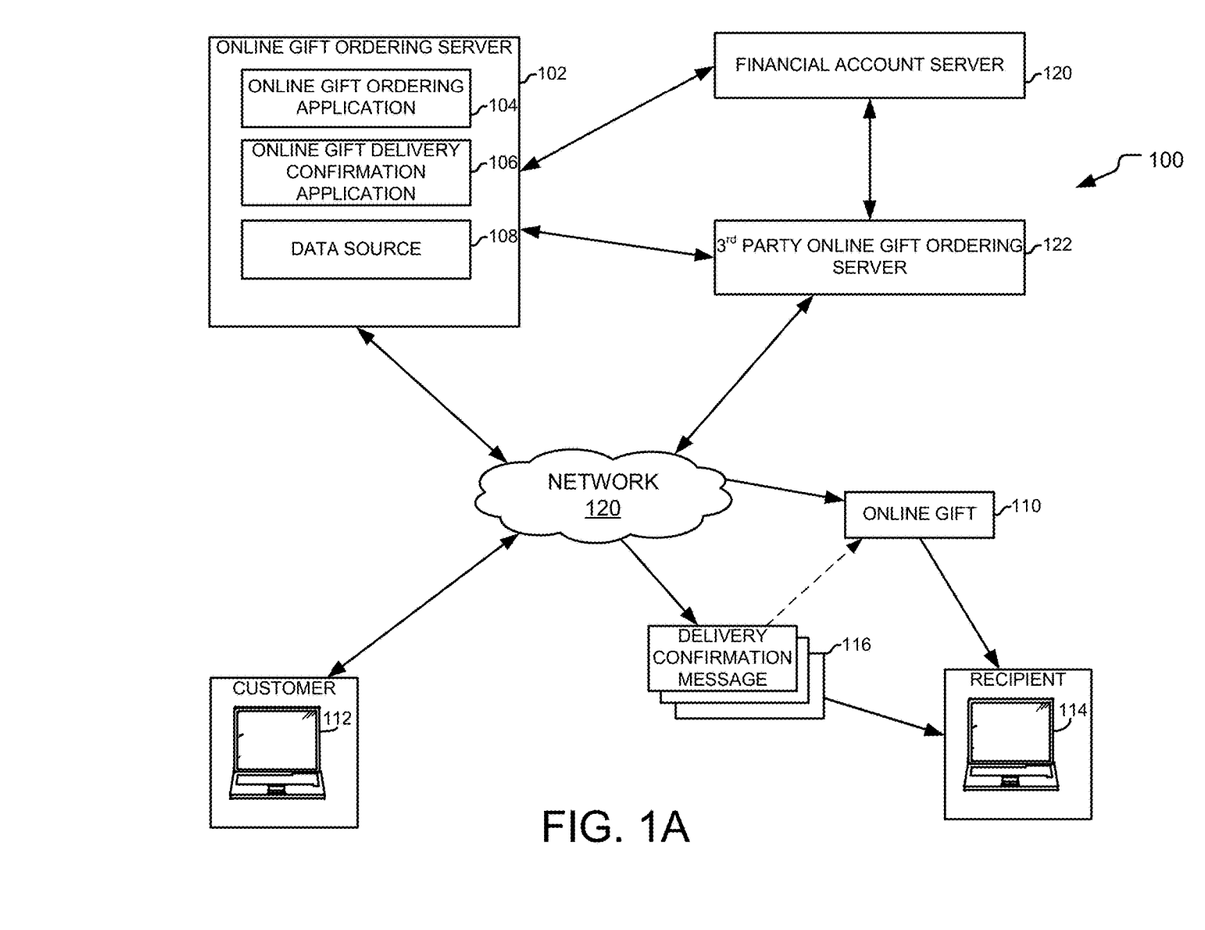
FIG. 1A is a block diagram of a computing system that includes an online gift delivery confirmation system according to one embodiment of the present disclosure.
Figure 1B:
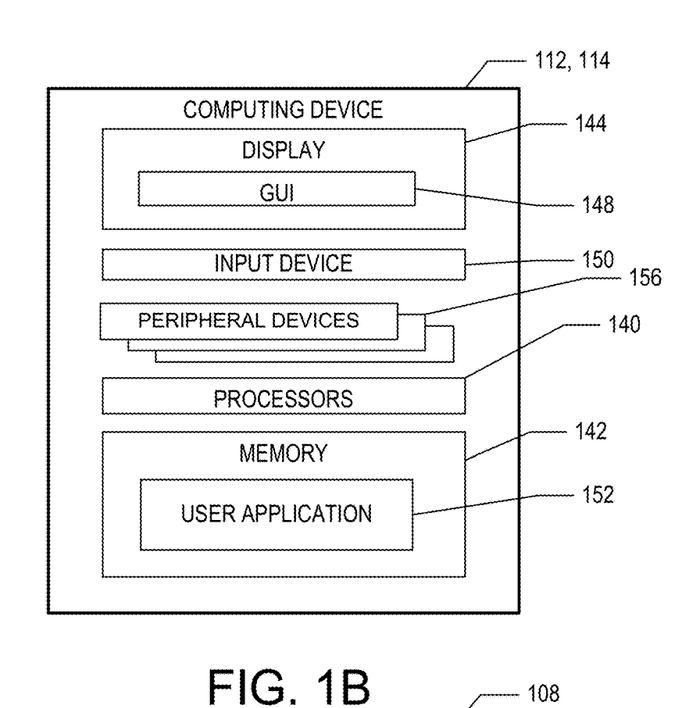
FIG. 1B depicts an exemplary embodiment of a computing device according to according to one embodiment of the present disclosure.
Figure 1C:
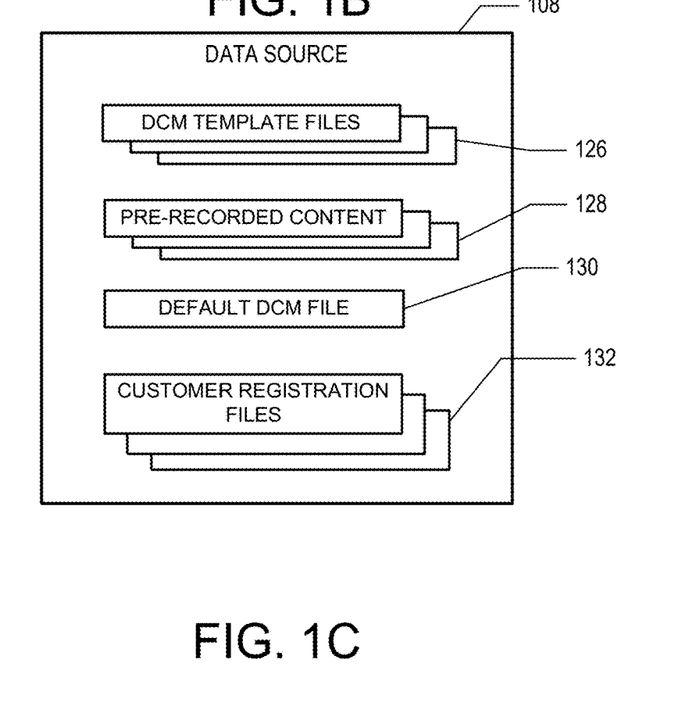
FIG. 1C depicts an exemplary embodiment of a data source according to an according to one embodiment of the present disclosure.

FIGS. 1A through 1C depict an example online gift delivery confirmation system 100 according to aspects of the disclosure. The system 100 includes an online gift ordering server 102 that includes an online gift ordering application 104, an online gift delivery confirmation application 106 and a data source 108. As will be described in detail below, online gift ordering system 104 facilitates a transaction for an online gift 110 from a customer computing device 112 of a customer to a recipient computing device 114 of a recipient, while the online gift delivery confirmation application 106 transmits one or more delivery confirmation messages 116 to the recipient computing device 114 to alert the recipient that the online gift 110 has been purchased and digitally transmitted.

Generally speaking, the online gift delivery confirmation application 106 receives delivery confirmation request information associated with the online gift 110 purchased by a customer for a recipient, and transmits the delivery confirmation messages 116 to a recipient computing device 114 associated with a recipient of the online gift 110. When a response to at least one of the delivery confirmation messages 116 is received from the recipient computing device 114, the application 106 transmits a customer confirmation message to the customer computing device 112 indicating that the recipient has responded to the delivery confirmation message. Otherwise, if the delivery confirmation messages have been transmitted and no response has been received from the recipient computing device 114, the application 106 transmits a customer delivery failure message to the customer computing device 112 indicating that the recipient has not acknowledged receipt of the delivery confirmation messages.

One or more delivery confirmation messages may be sent to the recipient. The number of delivery confirmation messages is a configurable parameter that may be set by the customer or may be a default value provided by the system 100. Additionally, an elapsed time between transmission of each delivery confirmation message may also be a configurable parameter that may be set by the customer or may be a default value provided by the system 100.

The delivery confirmation messages may be transmitted to the recipient via any desired protocol. For example, the delivery confirmation messages may be transmitted to the recipient computing device 114 via email messages using an email address of the recipient. As another example, the delivery confirmation messages may be transmitted to the recipient computing device via short messaging service (SMS) or multimedia messaging service (MMS) messages using a phone number of the recipient. Additionally, the delivery confirmation messages may be transmitted to the recipient computing device using the same protocol from which the online gift is delivered or from a protocol that is different from which the online gift is delivered.

Once a response to the delivery confirmation message has been received, the system 100 halts the process such no further delivery confirmation messages are sent. However, if the specified quantity of delivery confirmation messages has been sent with no response from the recipient, the system 100 transmits a delivery failure message back to the customer indicating failure of the recipient to respond. The delivery failure message may include one or more options that may be taken by the customer to secure delivery of the online gift to the recipient. For example, the delivery failure message may include a field for entry of an alternate element of contact information associated with the recipient for repeating the online gift delivery process. The alternate element of the contact information may include, for example, a different email address or a phone number of the recipient. In one embodiment, the alternate element of contact information may be provided to the application when the delivery confirmation request information is initially received such that the application automatically commences transmission of the delivery confirmation messages using the alternate contact information when the delivery failure message is generated.

Embodiments of the present disclosure provide certain advantages not heretofore recognized by conventional online gifting platforms. For example, the system 100 may provide for enhanced sales of online gifts due to greater confidence in the customer's mind that the online gift is actually received by the recipient. Additionally, the multiple delivery confirmation messages may also provide enhanced exposure of the online gift, both for the merchant who gains from advertising of the online gift, and the customer who gains additional appreciation from the recipient of the online gift. As yet another advantage, the merchant may charge a fee for the delivery confirmation service thus enhancing its revenue provided by its online gifting platform.

The online gift delivery confirmation system 100 according to the teachings of the present disclosure may be used in conjunction with any suitable online gifting platform that markets and sells any type of gift that is digitally transmitted to a recipient. For example, the online gift ordering application 104 may include a stored value card activation application conducts a financial transaction for a stored value card with a customer, and facilitates transmission of the stored value card to a recipient selected by the customer. Additional details related to the stored value card ordering system is described in U.S. Provisional Patent Application Ser. No. 61/737,731, filed Dec. 14, 2012, and entitled "Online Personalized Gifting System," which is a continuation in part of application Ser. No. 13/273,220, filed Oct. 13, 2011, and entitled "Online Personalized Gifting System." The contents of application Ser. Nos. 61/737,731 and 13/273,220 are both incorporated herein by reference in their entirety.

The online gift delivery confirmation application 106 may performs the operations described herein in conjunction with an online gift ordering application 104 locally executed on the same server, or with a third party online gift ordering server 122 managed independently from the online gift ordering server 102. For example, the third party online gift ordering server 122 may be a server managed and operated by a merchant that is separate and distinct from an entity that manages and operates the online gift delivery confirmation server 102. For example, the third party online gift ordering server 122 may facilitate interaction with the customer computing device 112, while the application 104 exposes one or more application program interfaces (APIs) to the third party online gift ordering server 122 for providing the features of the online gift delivery confirmation messaging system 100 described herein. In one embodiment, the application 104 is implemented in a service oriented architecture (SOA) such that the third party online gift ordering server 122 accesses the features of the application 104 as independently functioning services conforming to a web services description language (WSDL) protocol. Nevertheless, any suitable type communication protocol between the third party online gift ordering server 122 and the application 104 may be used for facilitating the online gift delivery confirmation messaging platform.

Examples of the online gift ordering server 102, third party online gift ordering server 122, and financial account server 120 include one or more servers, personal computers, mobile computers and/or other mobile devices, and other computing devices. The server 102 may communicate via wireless, wireline, and/or optical communications. The online gift ordering server 102, third party online gift ordering server 122, and financial account server 120 have one or more processors and executable instructions stored in volatile and/or non-volatile memory for performing the actions and/or steps described herein.

The data source 108 stores information that is used generating delivery confirmation messages that are sent to the recipient. In the particular embodiment shown, the data source 108 stores one or more delivery confirmation message template files 126, one or more pre-recorded content files 128, a default delivery confirmation message configuration file 130, and one or more customer registration files 132. The delivery confirmation message template files 126 stores one or more templates that may be selected and customized by the customer using content stored in the pre-recorded content files 128, or provided by the customer. The pre-recorded content files 128 stores content, such as textual, images, audio, and/or video content that may be selected by the customer for inclusion in a selected one of the delivery confirmation message templates. The default delivery confirmation message configuration file 130 stores information associated with default elapsed time values and a quantity of delivery confirmation messages to be transmitted to the recipient of the online gift, while the customer registration files 132 stores information associated with customized value for a particular customer to be used by that customer each time the online gift delivery confirmation service is used. Although the data source 108 is shown as being located on, at, or within the local server 102, it is contemplated that the data source 108 can be located remotely from the local server 102 in other aspects of the system 100, such as on, at, or within a database of a data management system or a database of another computing device or system having at least one processor and volatile and/or non-volatile memory.

The communication network 120 can be the Internet, an intranet, or another wired and/or wireless communication network. In one aspect, the server 102, customer computing device 112, recipient computing device 114, and the third party online gift ordering server 122 communicate with one another using any suitable protocol or messaging scheme. For example, server 102, customer computing device 112, recipient computing device 114, and the third party online gift ordering server 122 communicates using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows server 102, customer computing device 112, recipient computing device 114, and the third party online gift ordering server 122 communicate with one another through a network, other embodiments contemplate the server 102 communicating directly with the computing device 112 without the use of a separate and a distinct network. Additionally, other embodiments contemplate that the modules employed by the server 102 and the customer computing device 112 are integrated in one computing system.

The online gift delivery confirmation application 106 provides a mechanism for generating delivery confirmation messages that includes personalized content by uploading one or more photographs, customized text messages such as a greeting, add pre-recorded songs and/or sound or voice messages and include this content with the delivery confirmation messages. The user accesses the system 100 via the customer computing device 112 hosted by the online gift ordering server 102 using an HTML link or other suitable entry point, such as through application software (i.e., a mobile app) executed on a portable computing device, such as a wireless communication device. The online gift delivery confirmation application 106 uses the information provided by the customer to generate the delivery confirmation messages and transmits the messages to the recipient at times designated by the customer. The delivery confirmation messages may be digitally transmitted to the recipient using an e-mail message, a short message service (SMS), a multimedia messaging service (MMS), via a social media account, or other suitable digital communication medium.

FIG. 1B depicts an example embodiment of a customer computing device 112 or recipient computing device 114 according to one aspect of the online gift delivery confirmation system 100. The computing device 112, 114 is a computing or processing device that includes one or more processors 140 and memory 142. For example, the computing device 112, 114 can be a personal computer, such as a laptop or notebook computer, a workstation, or other processing device such as a personal digital assistant or a tablet computer. The computing device 112, 114 includes a display 144, such as a computer monitor, for displaying data and/or a graphical user interface 148. The computing device 112, 114 also includes an input device 150, such as a keyboard or a pointing device (e.g., a mouse, trackball, pen, or touch screen) to enter data into or interact with the graphical user interface 148. In one embodiment, the display 144 comprises a touch-screen device in which input is provided via contact by the user with the touch-screen device. The computing device 112, 114 receives data and/or communications from, and/or transmit data and/or communications to, the server 102 via the communication network 120.

The computing device 112, 114 includes a user application 152 stored in the memory 142 and executed on the processors 140 to generate the graphical user interface (GUI) 148 to the display 104. The graphical user interface 148 enables the computing device 112 of the customer to interact with one or more data entry forms received from the server 102 to enter configuration parameters for the delivery messages, and/or customization data for customizing the delivery confirmation messages. In one embodiment, the user application 152 includes a web browser that displays interactive web pages, applets, or other suitable user interface mechanisms including one or more selectable fields, editing screens, and the like for selecting content and/or modifying pre-recorded content by the customer. In another embodiment, the GUI application 152 includes application software (i.e., a mobile app) that is executed on the computing device 112, 114, which is, for example, a wireless communication device for providing one or more selectable fields, edit screens, and the like for selecting content and/or modifying pre-recorded content by the user.

Figure 2:
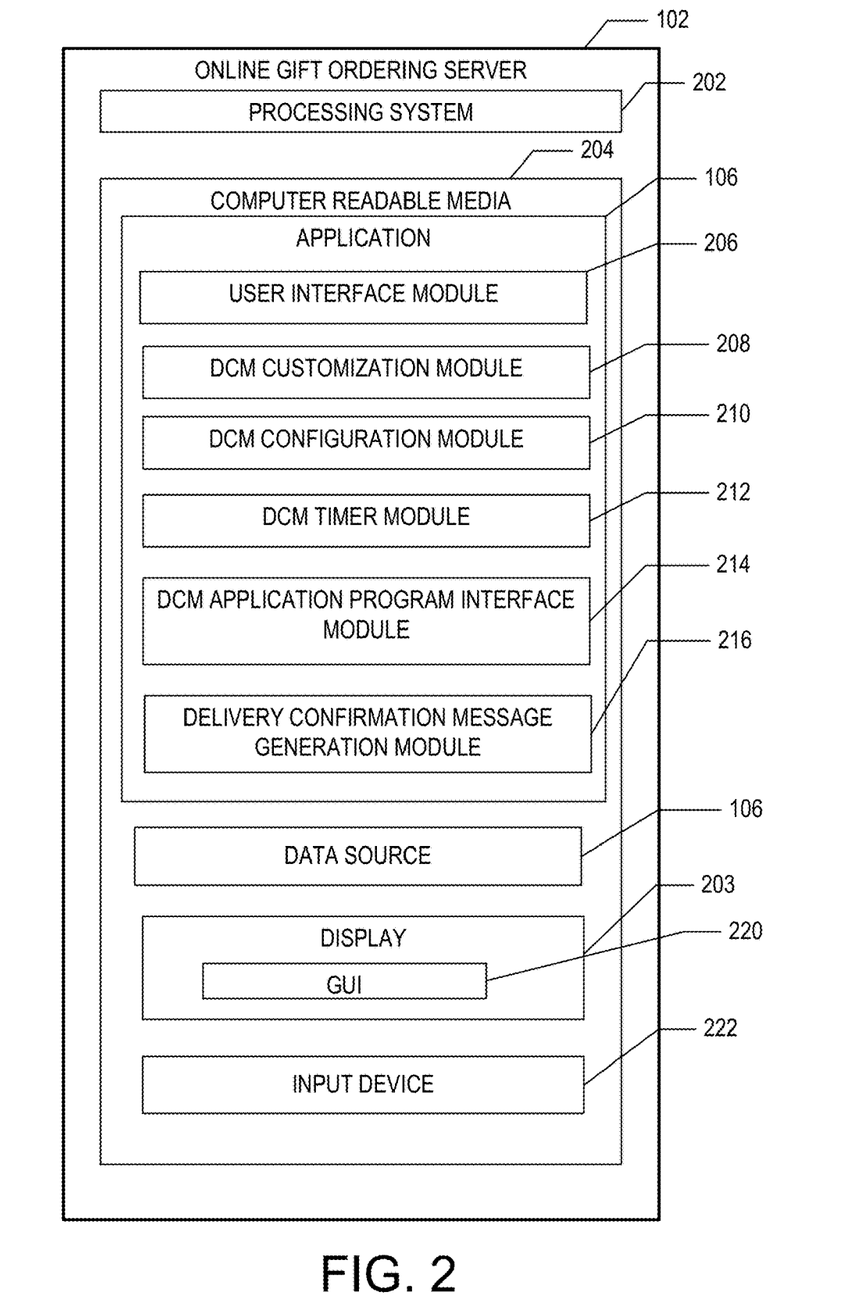
FIG. 2 is a block diagram of a computing system that includes an online gift delivery confirmation application according to according to one embodiment of the present disclosure.

FIG. 2 is a block diagram depicting an example online gift delivery confirmation application 106 executed on the online gift ordering server 102. According to one aspect, the online gift ordering server 102 includes a processing system 202 that includes one or more processors or other processing devices. A processor is hardware. The processing system 202 executes the online gift delivery confirmation application 106 to generate the GUI 148 on the computing device 112 for receiving delivery confirmation message configuration data and/or customized information for the delivery confirmation messages from the customer and generating delivery confirmation messages that are transmitted to a recipient. According to another aspect, the online gift ordering server 102 also includes a display 203, such as a computer monitor, for displaying data and/or a graphical user interface 220. The gift card activation server 202 also includes an input device 222, such as a keyboard or a pointing device (e.g., a mouse, trackball, pen, or touch screen) to enter data into or interact with the graphical user interface 220.

According to one aspect, the online gift ordering server 102 includes a computer readable medium 204 configured with the online gift delivery confirmation application 106. The online gift delivery confirmation application 106 includes instructions or modules that are executable by the processing system 202 to generate a customized delivery confirmation message to be sent to a recipient along with a selected gift card.

The computer readable medium 204 includes volatile media, nonvolatile media, removable media, non-removable media, and/or another available medium that can be accessed by the online gift ordering server 102. By way of example and not limitation, computer readable medium 204 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media embodies computer readable instructions, data structures, program modules, or other data and include an information delivery media or system.

A user interface module 206 facilitates the receipt of data and/or other communications from the customer computing device 112. In one example, the user interface module 206 communicates with the customer computing device 112 using a web browser executed on the customer computing device 112 to provide one or more selectable fields, editing screens, and the like for receiving content and/or modifying pre-recorded content by the customer. In another example, the user interface module 206 communicates with the customer computing device 112 using application software (i.e., a mobile app) executed on the customer computing device 112, such as a wireless communication device or tablet computer, to provide one or more selectable fields, editing screens, and the like for receiving content and/or modifying pre-recorded content by the customer. In yet another example, the user interface module 206 communicates with one or more peripheral devices 156 of the computing device 112 to receive user-supplied content to be included in the delivery confirmation messages.

A delivery confirmation message customization module 208 manages customization of the delivery confirmation messages. For example, the delivery confirmation message customization module 208 receives personalized content generated by the customer and processes the received user-supplied content to generate customized content to be included in the delivery confirmation message. For another example, the delivery confirmation message customization module 208 receives customer selection of a delivery confirmation message template including a particular design, such as one associated with a special occasion associated with the gift, such as, for example, a birthday, wedding, or a holiday, such as Christmas, Easter, Thanksgiving, and the like.

The application 106 also provides for selection of pre-recorded content stored in the data source 108, such as the pre-recorded content files 128. In a particular embodiment, the pre-recorded content includes a song or a portion of a pre-recorded song that is copyrighted and licensed by the owner of the copyrighted song. The delivery confirmation message customization module 208 modifies existing content, such as pre-recorded content or other previously received content, based upon input received from the customer computing system 112. An example of modifying existing content includes modifying a received photograph using one or more photograph editing features that provides for cropping, color hue adjustment, brightness adjustment, sizing, and/or other features associated with manipulation of digital imagery.

A delivery confirmation message configuration module 210 manages configuration of the delivery confirmation messages to be transmitted to the recipient. For example, the delivery confirmation message configuration module 210 may receive information associated with an elapsed time for transmission of each delivery confirmation message, a quantity of delivery confirmation messages to be transmitted. The delivery confirmation message configuration module 210 may also communicate with the delivery confirmation message customization module 210 to receive customization information associated with the delivery confirmation messages and storage in the customer registration files 132 in the data source 108.

A delivery confirmation message timer module 212 administers transmission of the delivery confirmation messages transmitted to the recipient computing device 114. For example, the delivery confirmation message timer modules 212 includes a clock and/or calendar that includes pointers to delivery confirmation messages and the times at which these delivery confirmation messages are to be transmitted to each recipient. Additionally, the delivery confirmation message timer modules 212 may also manage transmission of delivery confirmation failure messages, and/or delivery confirmation success messages to the customer.

A delivery confirmation message application program interface (API) module 214 exposes one or more interfaces for use by other online gift platforms managed by other merchants. For example, a server managed by a merchant, which is separate and distinct from the merchant managing the server 102, may access the application 106 via the delivery confirmation message API module 214 to implement delivery confirmation messages for online gifts purchased of it products sold through its online gift ordering system. The API modules may also include one or more financial transaction hooks for facilitating payment for the services provided by the system, such as via a per use basis or via a monthly subscription.

A delivery confirmation message generation module 216 facilitates the generation of the delivery confirmation messages to be sent to the recipient. In one example, the delivery confirmation messages are generated in digital form and transmitted to the recipient via any suitable communication mechanism, such as via an e-mail message, or a short message service (SMS) message.

It should be appreciated that the modules described herein is provided only as an example of a computing device that executes the online gift delivery confirmation application 106 according to the teachings of the present invention, and that other computing systems may have the same modules, different modules, additional modules, or fewer modules than those described herein. For example, one or more modules as described in FIG. 2 is combined into a single module. As another example, certain modules described herein is encoded on, and executed on other computing systems, such as the customer computing device 112.

Figure 3:
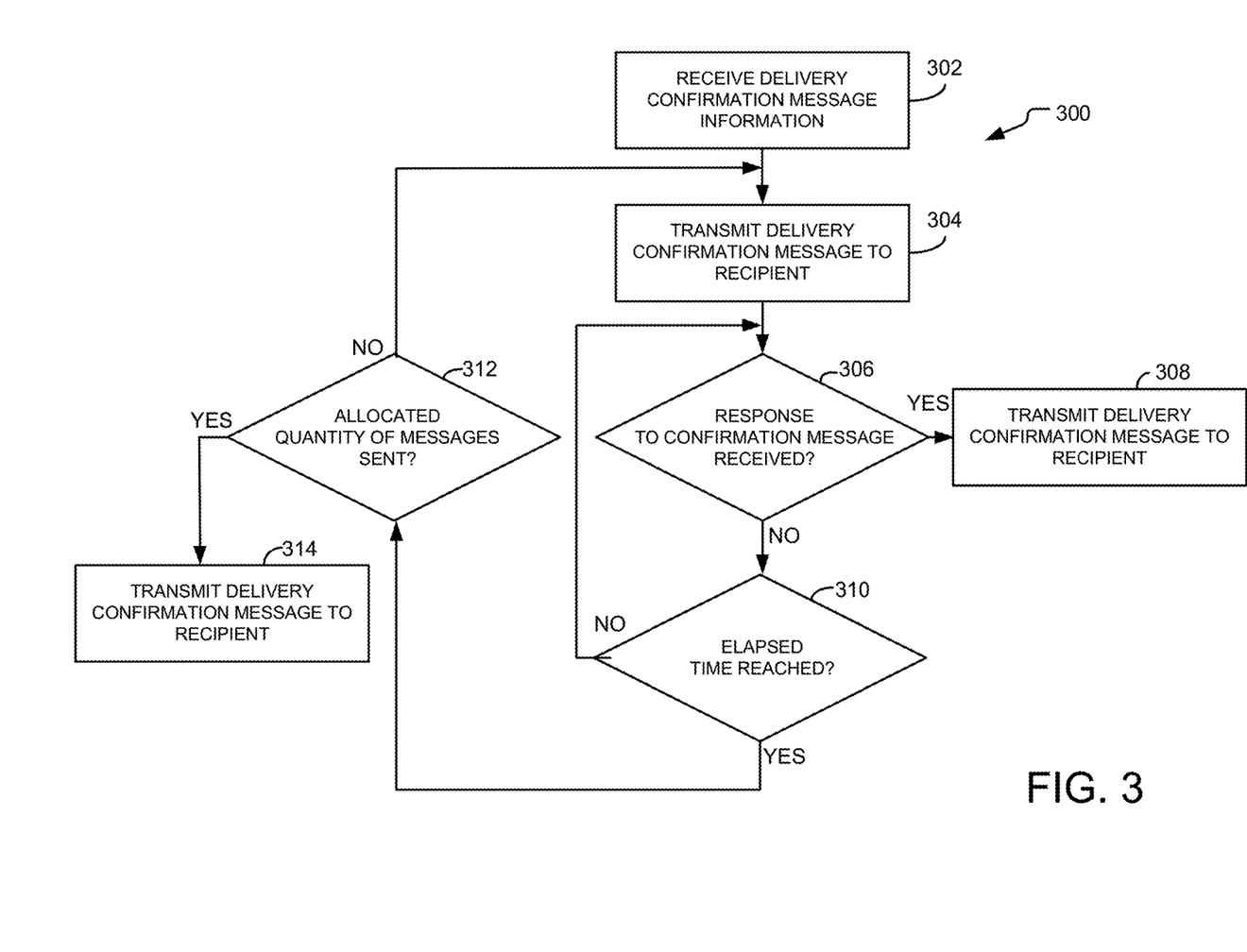
FIG. 3 is a flowchart depicting a process for creating a personalized delivery confirmation message according to according to one embodiment of the present disclosure.

FIG. 3 illustrates an example process that is performed by the online gift delivery confirmation application 106 according to the teachings of the present disclosure.

In step 302, the online gift delivery confirmation application 106 receives delivery confirmation information. The delivery confirmation information generally refers to information associated with a specified elapsed time for each delivery confirmation message, a specified number of delivery confirmation messages to be delivered, and/or any customized content to be included with each delivery confirmation message. In one embodiment, the delivery confirmation message includes customized content selected or provided by the customer. In another embodiment, the delivery confirmation message comprises generic information provided by the application 106. In yet another embodiment, the delivery confirmation message comprises information about the online gift provided by the application 106. For example, the application 106 may, based upon the time of year, determine that deer hunting season is about to begin and that the online gift is related to hunting, include information in the delivery confirmation message stating that the recipient hurry and accept the online gift.

In one embodiment, the delivery confirmation message information may be received from an interactive session with the customer, such as one in which the merchant sponsoring or selling the online gift also administers operation of the application 104. For example, the application 106 may be executed on a server that also executes an online gift ordering process for the merchant. In another embodiment, the delivery confirmation message information may be received from a third party online gift ordering server 122 that communicates directly with the customer computing device 112 and forwards content selected or provided by the customer to the application 106 via one or more APIs provided by the application 106.

Figure 4:
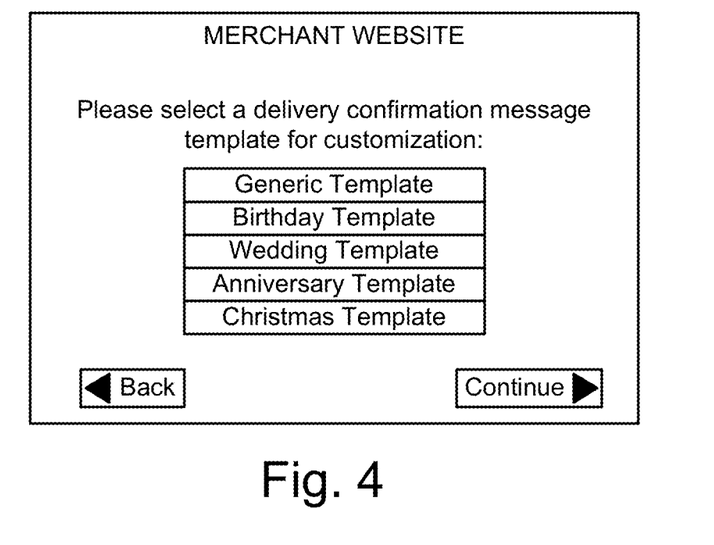
FIG. 4 illustrates an example delivery confirmation message template selection screen that is generated by the application according to one embodiment of the present disclosure.

In one embodiment, the delivery confirmation information is received from a customer who has previously purchased an online gift to be digitally delivered to a recipient. If the delivery confirmation message is to include customized content provided by the customer, the application 106 may generate a delivery confirmation message template selection screen (FIG. 4) on the customer computing device 112 for receiving selection of one from among multiple delivery confirmation message templates stored in the delivery confirmation message template files 126.

Figure 5:
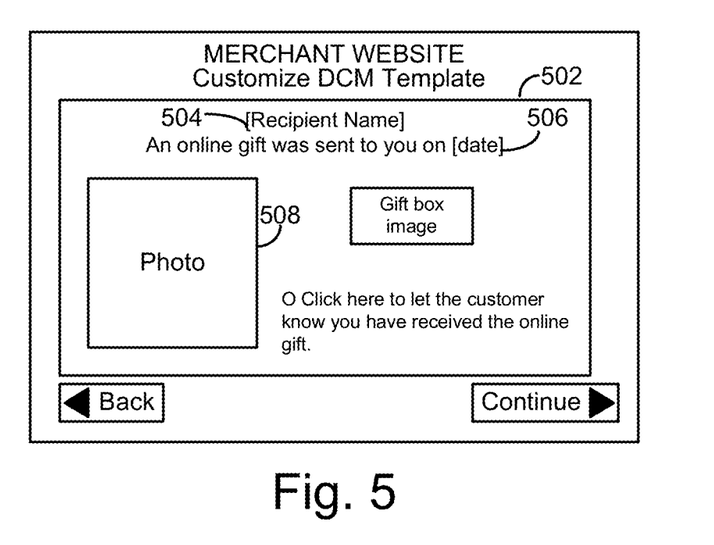
FIG. 5 illustrates an example delivery confirmation message template customization screen that is generated by the application according to one embodiment of the present disclosure.

Once selection of a delivery confirmation message template has been received, the application 106 may then generate a delivery confirmation message template customization screen (FIG. 5) for receiving content from the customer to be included in the template 502. For example, the delivery confirmation message template 502 may include a text field 504 that is modified by the customer to state the recipient's name, a photo field 506 for inclusion of a photograph or other image by the recipient. The template 502 may also include a date field 508 that may be edited either by the application 106 or the customer to indicate the date that the online gift was purchased and sent.

Figure 6:
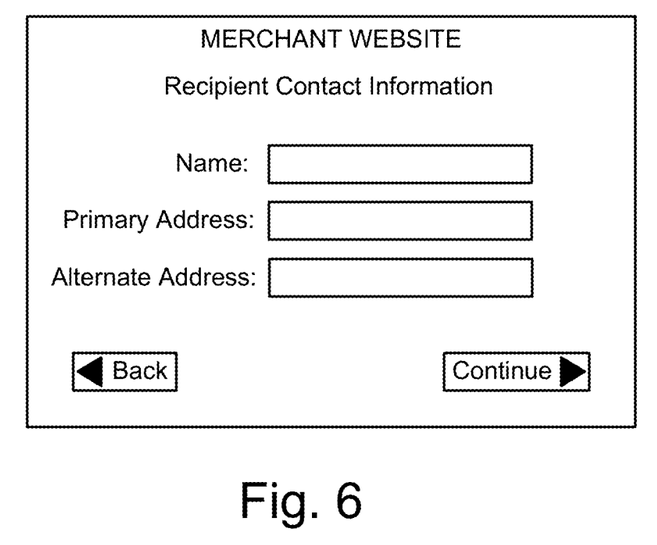
FIG. 6 illustrates an example address entry screen that is generated by the application according to one embodiment of the present disclosure.

To receive delivery confirmation message information, the application 106 may also generate an address entry screen (FIG. 6) on the customer computing device 112. Using the address entry screen, the application 106 may receive the name of the recipient as well as primary and alternate address information of the recipient. The primary address generally refers to an address (e.g., email address, phone number, etc.) that is initially used to send delivery confirmation messages to the recipient, while the alternate address generally refers to another address to be used in the event that no response from the recipient computing device 114 is received. For example, the application 106 may perform the process of FIG. 3 using the primary address, and if no response is received, the application 106 may again perform the process of FIG. 3 using the alternate address.

Figure 7:
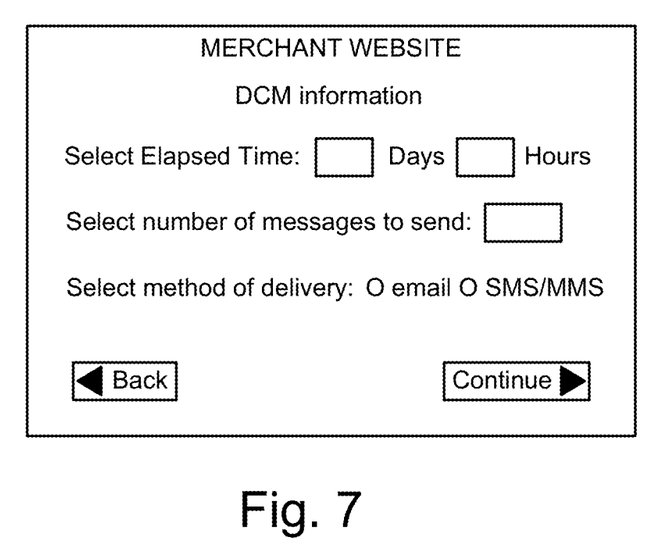
FIG. 7 illustrates an example delivery confirmation message information screen that is generated by the application according to one embodiment of the present disclosure.

The application 106 may receive other forms of information associated with the delivery confirmation messages to be transmitted to the recipient. For example, the application 106 may generate a delivery confirmation message information screen (FIG. 7) to receive other forms of information associated with the delivery confirmation messages, such as an elapsed period for transmission of each delivery confirmation message, a number of delivery confirmation message to be transmitted, and a method of delivery, which may be via email messages, or SMS/MMS messages.

Figure 8:
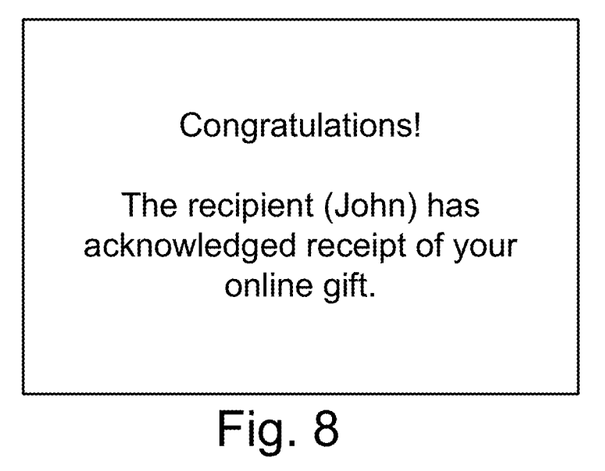
FIG. 8 illustrates an example delivery success message that is generated by the application and transmitted to the customer computing device according to one embodiment of the present disclosure.

In step 304, the application 106 transmits a first delivery confirmation message to the recipient computing device 114 at an address specified by the customer. If a response to the delivery confirmation message is received from the customer computing device 112 in step 306, processing continues at step 308 in with the application 106 transmits a delivery success message (FIG. 8) to the customer, otherwise processing continues at step 310 in which the application determines whether the specified elapsed time for delivery confirmation message has lapsed. If not, processing continues at step 306 in which the application 106 waits for a response from the recipient computing device 114. However, if the elapsed time has expired, processing continues at step 312 in which the application 104 determines whether the number of delivery confirmation messages have been transmitted to the recipient computing device 114. If so, processing continues at step 314 in which a delivery failure message (FIG. 9) is transmitted to the customer computing device 112, otherwise processing continues at step 304 in which another delivery confirmation message is transmitted to the recipient computing device 114.

Figure 9:
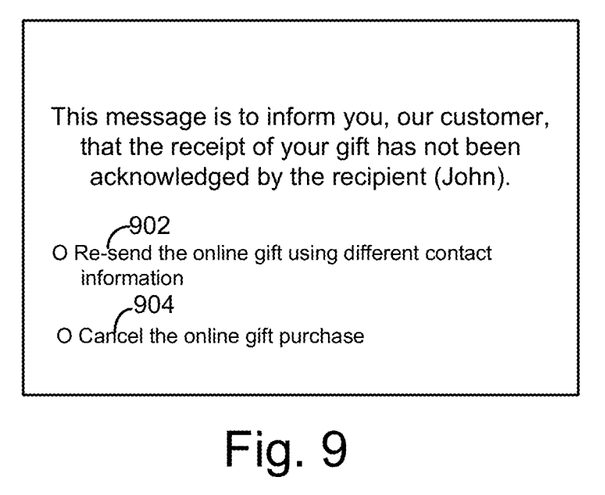
FIG. 9 illustrates an example delivery failure message that is generated by the application and transmitted to the customer computing device according to one embodiment of the present disclosure.

The delivery failure message includes any information that indicates, to the customer, that the recipient has not responded to any of the delivery confirmation messages transmitted to their recipient computing device 114. For example, the delivery failure message may include a first selection field 902 allowing the customer to perform the process of FIG. 3 again using an alternate address, such as a different email address if email messages are to be sent, or phone number if SMS/MMS messages are to be sent. The delivery failure message may also include a second selection field 904 that offers to allow the customer to cancel the transaction for the online gift. Nevertheless, it should be appreciated that any type of information may be included in the delivery failure message. For example, the delivery failure message may also other fields, such as one or more advertisements associated with other products for purchase from the merchant sponsoring the online gift that was purchased for the recipient.

When either of steps 308 or 314 is performed by the application 106, the process ends.

It should be appreciated that the steps described herein is provided only as an example of a process that is performed by the online delivery confirmation application 106 according to the teachings of the present invention, and that the online delivery confirmation application 106 may perform fewer, more, or different types of steps than those described herein. For example, the online delivery confirmation application 106 performs multiple steps described above as a single step. As another example, certain steps described herein is performed by other components of the online delivery confirmation system 100, such as by the customer computing device 112 owned by the user.

Those skilled in the art will appreciate that variations from the specific embodiments disclosed above are contemplated by the invention. The invention should not be restricted to the above embodiments, but should be measured by the following claims.

What is claimed is:

1. An online delivery servicing system comprising:
a server comprising at least one processor and at least one memory for storing an application that, when executed by the at least one processor, is executed to:
obtain, from a customer computing device associated with a customer, delivery confirmation request information associated with an online gift purchased by the customer for a recipient, the delivery confirmation request information associated with a quantity of delivery confirmation messages to be transmitted to a recipient of the online gift and a period of elapsed time for each delivery confirmation message, wherein the delivery confirmation messages are to inform the recipient that the online gift has been previously sent, and wherein the quantity of delivery confirmation messages is selected by the customer,
wherein the delivery confirmation messages are sent using a first set of contact information associated with the recipient,
wherein the quantity of delivery confirmation messages is a plurality of delivery confirmation messages;
at each period of elapsed time, transmit one of the delivery confirmation messages to a recipient computing device associated with the recipient;
when a response to the one delivery confirmation messages is received from the recipient computing device, transmit a customer confirmation message to the customer computing device, the customer confirmation message indicating that the recipient has responded to the one delivery confirmation messages; and
when the quantity of delivery confirmation messages has been transmitted and no response has been received from the recipient computing device, transmit a customer delivery failure message to the customer computing device, the customer delivery failure message including information for re-submission of the online gift by the customer,
wherein the information for re-submission includes a request for a second set of contact information associated with the recipient and an option for cancellation of the gift purchase.

2. The online delivery servicing system of claim 1, wherein the application is further executed to:
obtain the delivery confirmation request information from a second server managed by a merchant sponsoring the online gift purchased by the customer; and transmit the customer delivery failure message to the second server.

3. The online message delivery servicing system of claim 1, wherein the period of elapsed time for each delivery confirmation message is a configurable parameter that is selected by the customer.

4. The online message delivery servicing system of claim 1, wherein the customer delivery failure message comprises a request for different contact information of the recipient from the customer computing device.

5. The online message delivery servicing system of claim 1, wherein the gift comprises an online gift card.

6. The online message delivery servicing system of claim 1, wherein the delivery confirmation request message comprises contact information including at least one of an email address of the recipient, the delivery confirmation messages being transmitted via an email message.

7. The online message delivery servicing system of claim 1, wherein the delivery confirmation request message comprises contact information including a phone number of the recipient, the delivery confirmation messages being transmitted via at least one of a short messaging service (SMS) message or a multimedia messaging server (MMS).

8. The online message delivery servicing system of claim 1, wherein the application is further executed to, when the response the delivery confirmation message has been received from the recipient computing device, transmit a customer delivery success message to the customer computing device, the customer delivery success message indicating that the recipient has confirmed receipt of the online gift.

9. The online message delivery servicing system of claim 1, wherein the online gift is configured to be delivered at a future point in time, the elapsed time for the first of the delivery confirmation messages commencing after the future point in time.

10. The system of claim 1, wherein the quantity of delivery confirmation messages is at least three delivery confirmation messages.

11. A method comprising:
obtaining, using at least one processor executing instructions stored in a memory, delivery confirmation request information associated with an online gift purchased by a customer for a recipient of the online gift from a customer computing device associated with the customer, the delivery confirmation request information associated with a quantity of delivery confirmation messages to be transmitted to a recipient of the online gift and a period of elapsed time for each delivery confirmation message, wherein the delivery confirmation messages to inform the recipient that the online gift has been previously sent, and wherein the quantity of delivery confirmation messages is selected by the customer,
wherein the delivery confirmation messages are sent using a first set of contact information associated with the recipient,
wherein the quantity of delivery confirmation messages is a plurality of delivery confirmation messages;
obtaining at least one second set of contact information associated with the recipient;
at each period of elapsed time, transmitting, using the at least one processor, one of the delivery confirmation messages to a recipient computing device associated with the recipient;
when a response to the one delivery confirmation messages is received from the recipient computing device, transmitting, using the at least one processor, a customer confirmation message to the customer computing device, the customer confirmation message indicating that the recipient has responded to the one delivery confirmation message;
when the quantity of delivery confirmation messages has been transmitted and no response has been received from the recipient computing device, transmitting, using the at least one processor, a customer delivery failure message to the customer computing device, the customer delivery failure message including information for re-submission of the online gift by the customer and an option to cancel the gift purchase; and
when the quantity of delivery confirmation messages has been transmitted and no response has been received from the recipient computing device, automatically transmitting, using the at least one processor, the quantity of delivery confirmation messages to the at least one second set of contact information associated with the recipient.

12. The method of claim 11, further comprising:
obtaining the delivery confirmation request information from a second server managed by a merchant sponsoring the online gift purchased by the customer; and
transmitting the customer delivery failure message to the second server.

13. The method of claim 11, further comprising configuring the period of elapsed time for each delivery confirmation message by the customer computing device.

14. The method of claim 11, wherein the customer delivery failure message comprises a request for different contact information of the recipient from the customer computing device.

15. The method of claim 11, wherein the delivery confirmation request message comprises contact information including at least one of an email address of the recipient, the delivery confirmation messages being transmitted via an email message.

16. The method of claim 11, further comprising:
when the response the delivery confirmation message has been received from the recipient computing device, transmitting a customer delivery success message to the customer computing device, the customer delivery success message indicating that the recipient has confirmed receipt of the online gift.

17. The method of claim 11, further comprising configuring the online gift to be delivered at a future point in time, the elapsed time for the first of the delivery confirmation messages commencing after the future point in time.

18. Code implemented on a non-transitory, computer-readable medium, when executed by at least one processor, operable to perform at least the following:
obtaining, using at least one processor executing instructions stored in a memory, delivery confirmation request information associated with an online gift purchased by a customer for a recipient of the online gift from a customer computing device associated with the customer, the delivery confirmation request information associated with a quantity of delivery confirmation messages to be transmitted to a recipient of the online gift and a period of elapsed time for each delivery confirmation message, wherein the delivery confirmation messages to inform the recipient that the online gift has been previously sent, and wherein the quantity of delivery confirmation messages is selected by the customer,
wherein the delivery confirmation messages are sent using a first set of contact information associated with the recipient,
wherein the quantity of delivery confirmation messages is a plurality of delivery confirmation messages;
obtaining at least one second set of contact information associated with the recipient;
at each period of elapsed time, transmitting, using the at least one processor, one of the delivery confirmation messages to a recipient computing device associated with the recipient;
when a response to the one delivery confirmation message is received from the recipient computing device, transmitting, using the at least one processor, a customer confirmation message to the customer computing device, the customer confirmation message indicating that the recipient has responded to the one delivery confirmation message;
when the quantity of delivery confirmation messages has been transmitted and no response has been received from the recipient computing device, transmitting, using the at least one processor, a customer delivery failure message to the customer computing device, the customer delivery failure message including information for re-submission of the online gift by the customer and an option to cancel the gift purchase; and
when the quantity of delivery confirmation messages has been transmitted and no response has been received from the recipient computing device, automatically transmitting, using the at least one processor, the quantity of delivery confirmation messages to the at least one second set of contact information associated with the recipient.

19. The code of claim 18, further executed to, when the response the delivery confirmation message has been received from the recipient computing device, transmitting a customer delivery success message to the customer computing device, the customer delivery success message indicating that the recipient has confirmed receipt of the online gift.

20. The method of claim 11, wherein the quantity of delivery confirmation messages is at least three delivery confirmation messages.

* * * * *